United States Patent [19]

LaWhite et al.

[11] Patent Number: 4,491,970
[45] Date of Patent: Jan. 1, 1985

[54] PORTABLE TRANSMITTER FOR EMERGENCY ALARM SYSTEM HAVING WATERTIGHT ENCLOSURE

[75] Inventors: Eric L. LaWhite, So. Royalton, Vt.; Patrick G. Phillipps, Lincoln, Mass.

[73] Assignee: Lifeline Systems, Inc., Waltham, Mass.

[21] Appl. No.: 454,855

[22] Filed: Dec. 30, 1982

[51] Int. Cl.$^3$ ............................................. H04B 1/034
[52] U.S. Cl. ...................................... 455/100; 455/128
[58] Field of Search .................. 455/89, 90, 95–100, 455/128, 351; 340/539, 696

[56] References Cited

U.S. PATENT DOCUMENTS

| 3,032,651 | 5/1962 | Gisiger-Stahli et al. | 455/351 |
| 3,289,085 | 11/1966 | Leland | 455/128 |
| 4,121,160 | 10/1978 | Cataldo | 455/100 |

FOREIGN PATENT DOCUMENTS

| 2725449 | 12/1978 | Fed. Rep. of Germany | 455/100 |
| 2481492 | 10/1981 | France | 455/90 |
| 1563387 | 3/1980 | United Kingdom | 455/100 |

Primary Examiner—Jin F. Ng
Attorney, Agent, or Firm—Weingarten, Schurgin, Gagnebin & Hayes

[57] ABSTRACT

The present invention provides a small portable radio transmitter unit which can be worn on the wrist or suspended from a neck chain to provide immediate access in the event of an emergency condition and without interfering with the normal day-to-day activities of the wearer. The unit is contained within a watertight housing having a resilient membrane depressible by finger pressure to actuate a button switch within the housing for actuation of the transmitter. The housing is vented to the atmosphere to provide equalization of internal and ambient pressure in a manner providing isolation from water or other liquid entry to thereby maintain a watertight enclosure.

7 Claims, 7 Drawing Figures

PORTABLE TRANSMITTER FOR EMERGENCY ALARM SYSTEM HAVING WATERTIGHT ENCLOSURE

FIELD OF THE INVENTION

This invention relates to emergency alarm systems, and more particularly to a portable radio transmitter unit for actuation of a telephone emergency alarm.

BACKGROUND OF THE INVENTION

A telephone emergency alarm response system is the subject of U.S. Pat. Nos. 3,989,900 and 4,064,368 of the same assignee as herein and comprises an alarm system coupled to a residential telephone and capable of sending an alarm to a central station in response to actuation of a switch or call button. The switch can be wired to the alarm system or can be part of a wireless radio transmitter unit as described in U.S. Pat. No. 4,064,368. Such emergency alarm systems provide monitoring of and response to the needs of elderly or infirm persons confined to their residences, and the comfort and security of those persons can be enhanced by the ready accessibility of the switch for use in the event that an emergency occurs.

Portable transmitter units of known construction are not watertight and therefore cannot be worn or carried by a user in the bathtub or shower, which is a frequent site of accidental falls and where the accessibility of the unit is important in summoning help. Presently known units are also of a size and weight to discourage their being carried about by a user, with resultant increased risk to the user in the event of an emergency. In addition, present units have relatively short battery life requiring a battery change at least once each year.

SUMMARY OF THE INVENTION

The present invention provides a miniature portable radio transmitter unit which can be worn on the wrist or suspended from a neck chain to provide immediate access in the event of an emergency condition and without interfering with the normal day-to-day activities of the wearer. The unit is contained within a small watertight housing, about the size of a wristwatch case, and having a resilient membrane depressible by finger pressure to actuate a button switch within the housing for actuation of the transmitter. The housing is vented to the atmosphere to provide equalization of internal and ambient pressure in a manner providing isolation from water or other liquid entry to thereby maintain a watertight enclosure. The unit is sufficiently small, lightweight and impervious to water such that it is easily worn during all usual home activities without impediment. The batteries are of relatively long life, typically five years, eliminating the need to open the housing for battery changing.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
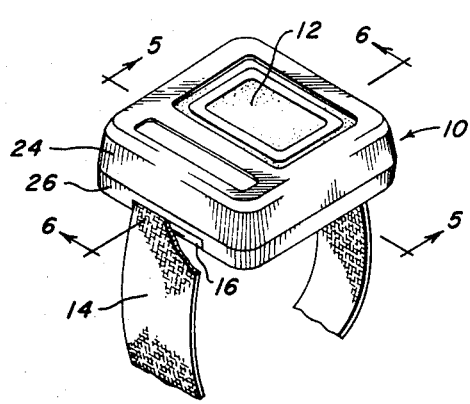
FIG. 1 is a pictorial view of the transmitter unit affixed to a wrist strap.
Figure 2:
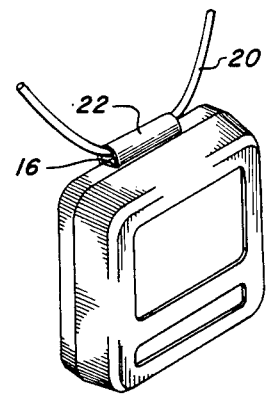
FIG. 2 is a pictorial view of the unit suspended from a neck cord.
Figure 3:
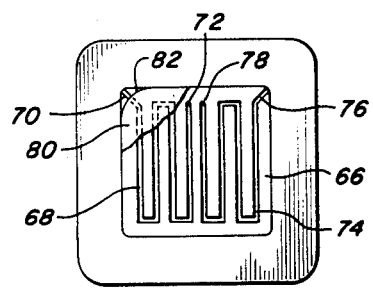
FIG. 3 is a rear view of the housing illustrating the venting passages.
Figure 6:
FIG. 6 is a sectional elevation view of the lower housing section taken along lines 6—6 of FIG. 1.

The wireless unit is shown in outward appearance in FIGS. 1 and 2 and includes a housing 10 of generally square configuration and adapted to be worn on the wrist by means of a wrist strap, as shown in FIG. 1, or hung as a pendant from a cord, as shown in FIG. 2. The housing includes on the upper face thereof a resilient membrane 12 operative in response to finger pressure to deform to cause actuation of a button switch disposed within the housing and which switch is operative to actuate the transmitter disposed within the housing. The housing is attached to a wrist strap 14 by means of spring loaded pins 16 which can be the same as pins used to fasten a wrist strap to a watch. The pins are retained in the housing by means of confronting holes 18 (FIG. 6) provided on respective opposite sides of the bottom of the housing. For suspending the housing from a cord 20, a cylindrical sleeve 22 is disposed over one of the pins 16, the sleeve being of sufficient diameter to accommodate the cord. The elongated sleeve is useful to prevent twisting of the housing on the cord when worn about the neck of a user.

The housing is composed of a first section 24 and a second section 26 each of integral plastic molded construction, the sections being joined about confronting edges to form a fully enclosed housing structure. The first section 24 includes a front or top wall and four side walls and a rectangular opening 28 through the top wall for accommodation of the resilient membrane 12. A ridge 30 is disposed about the periphery of the opening 28 and extends inwardly of the housing. A flange 32 is disposed about the housing opening and spaced from the ridge 30. Ribs 34 are provided between the inner surface of the top wall and the confronting side walls, the edges 36 of these ribs providing supports for the transmitter circuit board 38 disposed within the housing.

The resilient membrane 12 includes a central portion 40 configured to fit within the opening in the top wall, and a peripheral raised portion 42 configured to fit within and in engagement with the flange 32. A plastic frame 44 secures the resilient membrane to the housing and includes a flange 46 adapted to fit around the inner surfaces of the membrane peripheral ridge 42 and a flat portion adapted to be bonded to the peripheral flange 32 of the top wall. The frame is preferably ultrasonically bonded to the peripheral flange and is operative to compress the membrane flange 42 and to urge the membrane flange into sealing engagement with the ridge 30 and the confronting surfaces of the housing wall. The membrane is thus in sealing engagement with the housing, the seal being sufficient to prevent entry of air, moisture, or liquid.

Figure 5:
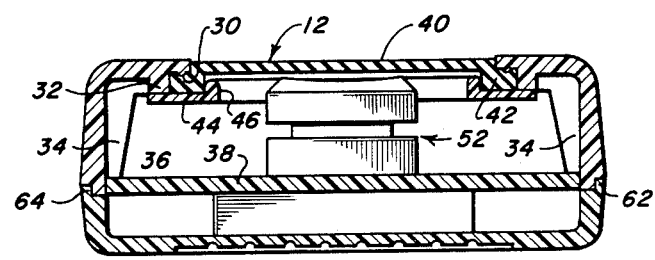
FIG. 5 is a cutaway elevation view of the housing taken along lines 5—5 of FIG. 1 with the transmitter circuit removed for purpose of clarity.
Figure 4:
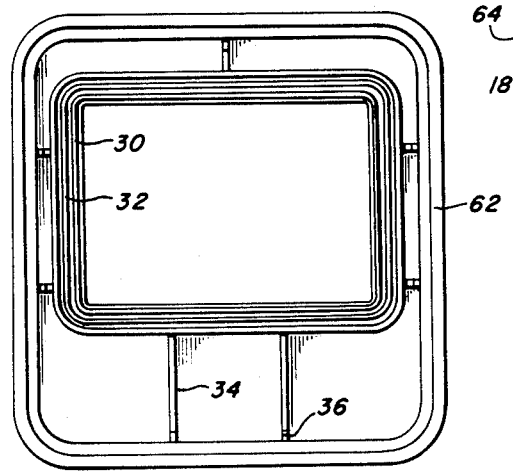
FIG. 4 is a plan view of the interior of the upper housing section.
Figure 7:
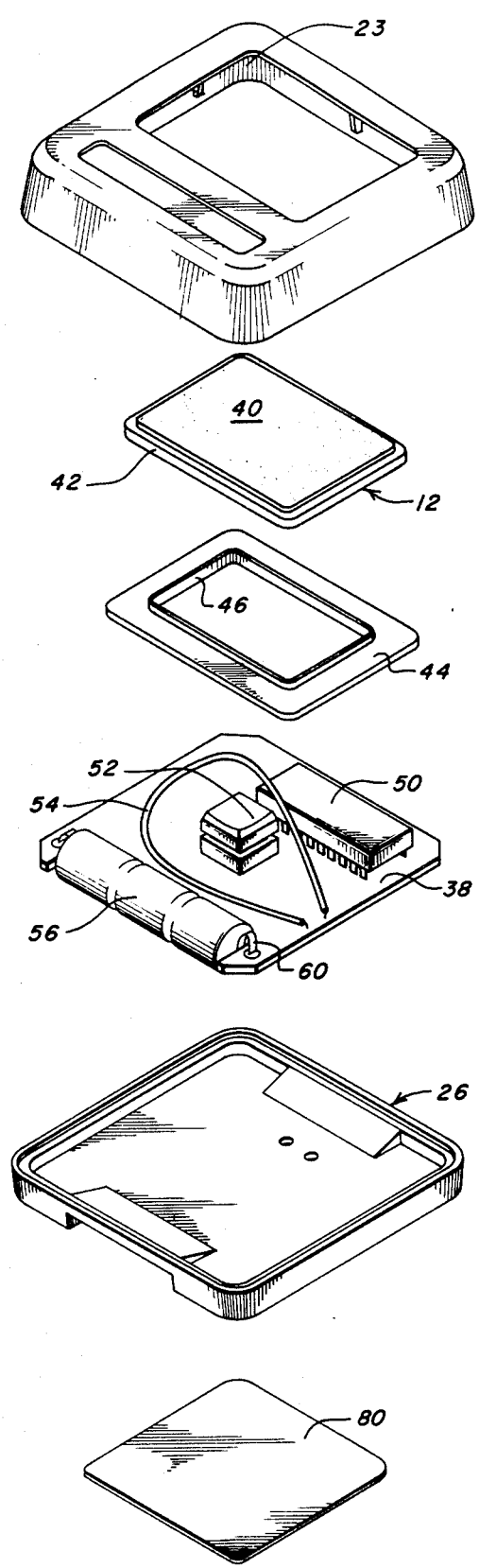
FIG. 7 is an exploded pictorial view of the unit.

The printed circuit board 38 is supported on the edges 36 of the housing ribs as illustrated in FIG. 5. The circuit board is shown in FIG. 7 and includes a battery powered transmitter 50, preferably of integrated circuit form, and a push button switch 52 outwardly extending from the circuit board in confronting actuable relation to the resilient membrane 12. The push button switch is spring loaded in an upward normally off position. Depression of the switch via the membrane 12 causes switch actuation and consequent transmitter actuation. An antenna 54 is disposed generally around the periphery of the board 38 and is in circuit with the transmitter. A plurality of batteries 56 are disposed within the portion 58 (FIG. 4) of the housing and are connected electrically in series by means of conductive straps, and are also connected by conductive straps 60 to the transmitter circuit. The batteries can be contained in a plastic sleeve for mechanical retention. Typically, the batteries have a five-year useful life, after which the unit is replaced with a new one.

The housing section 24 has a peripheral recess 62 matable with a peripheral flange 64 of the housing section 26, and the confronting surfaces of the two housing sections are ultrasonically or otherwise bonded together to form a sealed enclosure. The outer face of the housing section 26 includes a recessed area 66 containing a first sinuous path 68 extending from an end 70 to a hole 72 through the section wall, and a similar sinuous path 74 extending from an end 76 to a hole 78 through the section wall. A cover plate 80 is fitted within the recess 66 and is bonded therein, the cover plate having rounded edges 82 which expose the respective ends of the sinuous paths. These paths provide venting of the housing interior while substantially eliminating the entry of water or other liquid into the housing interior. The paths are each of sufficiently small cross section and sufficient length to prevent the transmission of liquid which will not, by reason of its surface tension, be capable of movement along the paths. Venting of the housing interior is desirable to equalize pressure changes which can occur during normal wearing of the unit. The pressure variations experienced by the unit can be significant, especially when travelling in high speed elevators in high rise buildings, in airplane travel, and in travel in mountainous locales. Without venting of the interior, it is possible that a sufficient pressure increase can be experienced within the sealed housing to provide false actuation of the button switch. By virtue of the invention, venting is optimally provided without fear of liquid entry. The housing can be immersed in water without entry of water into the housing interior, and the housing is substantially isolated from the usual environments in which a user is found.

It should be recognized that the invention can be employed in various systems in which remote activation of an alarm or other device is desired. Accordingly, the invention is not limited to what has been particularly shown and described except as indicated in the appended claims.

What is claimed is:

1. For use in remote actuation of apparatus, a miniature wireless radio transmitter unit comprising:
   a housing of a size wearable on the wrist of a user and containing a radio transmitter, antenna, and manually actuable button switch within the housing;
   a resilient membrane sealed to an opening in the front face of the housing and in confronting relation to the button switch and deformable in response to finger pressure to cause actuation of the button switch;
   at least one elongated narrow passage in the housing in communication at one end with a vent hole through a face of the housing, and in communication at the other end with the atmosphere;
   the passage being operative to provide equalization of air pressure between the housing interior and the atmosphere and isolation of the housing interior from entry of liquid;
   said resilient membrane includes a central portion configured to fit within the opening in the front wall of the housing and a peripheral portion configured to fit within a flange of the housing which is in surrounding spaced relation to the opening; and
   a frame secured to the flange and operative to compress the peripheral portion of the membrane into sealing engagement with confronting surfaces of the housing.

2. A unit of claim 1 wherein the flange of the housing includes a ridge onto which the peripheral portion of the resilient membrane is compressed to provide sealing engagement with the housing.

3. The unit of claim 1 wherein the housing has a first section and a second section, each of integral plastic molded construction, the sections having confronting matable edges bonded together to form a sealed enclosure.

4. The unit of claim 3 wherein the first section of the housing includes:
   a ridge disposed about the opening in the front wall of the housing and extending inwardly of the housing;
   a flange disposed about the housing opening and outwardly spaced from the ridge;
   the resilient membrane having a peripheral portion configured to fit within the flange;
   the housing including frame means bonded to the flange and operative to compress the peripheral portion of the membrane into sealing engagement with the ridge.

5. The unit of claim 4 wherein the first section of the housing includes a plurality of ribs spaced about the periphery of the housing interior and having edges operative to provide support for a transmitter circuit board disposed within the housing.

6. The unit of claim 1 wherein a face of the housing includes a recessed area containing one or more of the elongated narrow passages.

7. The unit of claim 1 wherein the at least one elongated narrow passage is of sinuous configuration and of a length and sufficiently small cross section to prevent the transmission of liquid therealong.

* * * * *